United States Patent Office 3,313,818
Patented Apr. 11, 1967

3,313,818
7,10 - DIHYDRO - 3,10 - DIOXO-7-(LOWER-ALKYL)-3H - PYRANO[3,2 - f]QUINOLINE - 3 - CARBOXYLIC ACID DERIVATIVES
George Y. Lesher, Schodack, N.Y., assignor to Sterling Drug Inc., New York, N.Y., a corporation of Delaware
No Drawing. Filed Apr. 14, 1965, Ser. No. 447,954
8 Claims. (Cl. 260—287)

This invention relates to 3H-pyrano[3,2-f]quinoline derivatives and preparation thereof.

The invention sought to be patented, in its composition aspect, resides in the class of compounds which I designate 7,10-dihydro-3,10-dioxo-7-(lower-alkyl) - 9 - X-3H-pyrano[3,2-f]quinolines where X stands for carboxy or lower-carbalkoxy. Accordingly, I depict these compounds as having lower-alkyl attached to the 7-nitrogen atom of 7,10-dihydro-3,10-dioxo-9-X-3H-pyrano[3,2-f] quinolines where X is defined as above. The tangible embodiments of this composition aspect of the invention possess the inherent applied use characteristics of having antibacterial and anthelmintic properties, as determined by standard chemotherapeutic evaluation procedures.

Without limiting the generality of the foregoing, illustrative and preferred embodiments of my 7,10-dihydro-3,10-dioxo-7-(lower-alkyl)-9-X-3H - pyrano[3,2-f]quinolines are those of Formula I

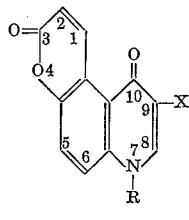

I where X is carboxy or lower-carbalkoxy, and R is lower-alkyl. The pyrano-quinoline nucleus can bear substituents at other positions, e.g., 1, 2, 5, 6 and 8, said substituents being illustrated by, but not limited to, lower-alkyl at positions 1, 2, 5, 6 or 8, lower-alkoxy at positions 1, 2, 5 or 6, and halo at positions 2, 5 or 6.

The term "lower-carbalkoxy," as used throughout the specification, e.g., for X in Formula I, means carbalkoxy radicals where the alkoxy portion can be straight- or branch-chained and has preferably from one to six carbon atoms, as illustrated by carbomethoxy, carbethoxy, carbo-n-propoxy, carbisopropoxy, carbo-n-butoxy, carbo-n-hexoxy, and the like.

Each of the terms "lower-alkyl" and "lower-alkoxy," as used throughout the specification, means lower-alkyl or lower-alkoxy radicals having preferably from one to six carbon atoms which can be arranged as straight or branched chains, and are illustrated by methyl, ethyl, n-propyl, isopropyl, 2-butyl, n-hexyl, etc., for lower-alkyl; and by methoxy, ethoxy, n-propoxy isopropoxy isobutoxy, n-amoxy, n-hexoxy, etc., for lower-alkoxy.

The term "halo," as used throughout the specification, includes chloro, bromo, iodo or fluoro.

The invention in its process aspect, is described as residing in the process of reacting a 10-hydroxy-3-oxo-9-X-3H-pyrano[3,2-f]quinoline where X is defined as above, and is preferably lower-carbalkoxy, with a lower-alkyl ester of a strong acid, i.e., an acid which is practically completely dissociated in aqueous solution, to prepare a 7,10-dihydro-3,10-dioxo-7-(lower-alkyl)-9-X-3H-pyrano[3,2-f]quinoline, illustrated above by Formula I. Illustrative and preferred esters are lower-alkyl esters of a strong inorganic acid or an organic sulfonic acid, having the formula R-An, where R is lower-alkyl and An is an anion of a strong inorganic acid or an organic sulfonic acid, e.g., chloride, bromide, iodide, sulfate, methanesulfonate, benzenesulfonate, para-toluenesulfonate, and the like. The chloride, bromide or iodide is preferred because of the more ready availability of the requisite lower-alkyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium bicarbonate, potassium bicarbonate, sodium alkoxides, potassium alkoxides, sodium amide, and the like. The purpose of the acid-acceptor is to take up the hydrogen halide (or HAn) which is split out during the course of the reaction. The reaction can be carried out either in the presence or absence of a suitable solvent, but preferably in a solvent such as a lower - alkanol, acetone, dioxane, dimethylformamide, methyl isobutyl ketone, dimethyl sulfoxide, or a mixture of such solvents, e.g., a mixture of water and a lower-alkanol. The reaction is generally carried out at a temperature between about room temperature (about 25° C.) and 150° C., preferably at reflux, in a lower-alkanol solvent, in a mixture of water and a lower-alkanol, or in dimethyl sulfoxide or dimethylformamide.

To illustrate the preparation of the preferred 7,10-dihydro-3,10-dioxo-7-(lower-alkyl)-9-X-3H-pyrano - [3,2-f]quinolines of Formula I, my process comprises reacting the corresponding 10-hydroxy-3-oxo-9-X-3H-pyrano[3,2-f]quinolines of Formula II

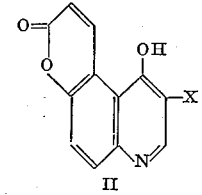

II where X has the meaning given above for Formula I, with an ester having the formula R-An, where R has the meaning given above for Formula I and An is an anion of a strong inorganic acid or an organic sulfonic acid, in the presence of an acid-acceptor.

When X is carboxy, i.e., when the intermediate is a 10-hydroxy-3-oxo - 3H - pyrano[3,2-f]quinoline - 9 - carboxylic acid, the reaction is conveniently carried out by refluxing the acid with a lower-alkyl ester, preferably halide, in aqueous ethanol in the presence of potassium or sodium hydroxide to yield the corresponding 7,10-dihydro-3,10-dioxo-7-(lower-alkyl)- 3H-pyrano[3,2-f]quinoline-9-carboxylic acid; the same 3-carboxy compound is also obtained using these reaction conditions and a lower-alkyl 10-hydroxy-3-oxo-3H-pyrano[3,2-f]quinoline-9-carboxylate as the intermediate, the ester hydrolyzing under the reaction conditions to form the acid. If the final product is desired in ester form, e.g., the ethyl ester, the intermediate lower-alkyl 10-hydroxy-3-oxo-3H-pyrano-[3,2-f]quinoline-9-carboxylate is reacted as above using a non-aqueous medium, for example, using refluxing ethanol as the solvent and sodium ethoxide as the acid-acceptor or using dimethylformamide or dimethyl sulfoxide as the solvent and anhydrous potassium carbonate as the acid-acceptor.

Also within the scope of the invention are salts of my above-described 7,10-dihydro-3,10-dioxo-7-(lower-alkyl)-3H-pyrano[3,2-f]quinoline-9-carboxylic acids. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts, e.g., diethanolamine or N-methylglucamine salts. Although therapeutically acceptable salts are preferred, other and all cationic salts are within the scope of my invention. All such salts, including those having toxic cations, are useful in characterizing the free acids and as intermediates in purification of the free acids. The salts are prepared from the acids using conventional methods for converting acids into salts.

My invention also comprehends the intermediate 10-hydroxy-3-oxo-9-X-3H-pyrano[3,2-f]quinolines, illustrated above by Formula II. These intermediates were prepared according to the procedure illustrated structurally for preferred embodiments as follows:

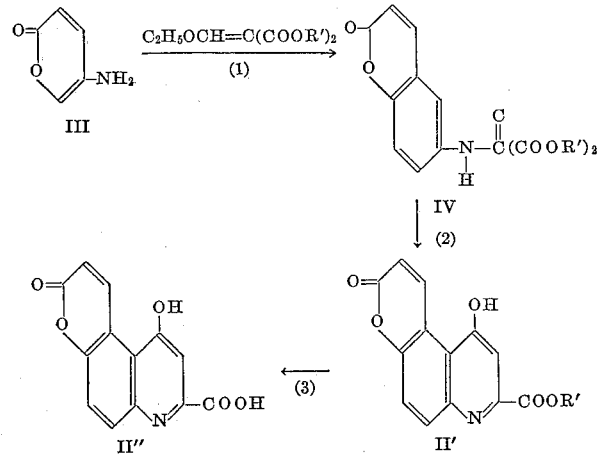

where R' is lower-alkyl. My 10-hydroxy-3-oxo-9-X-3H-pyrano[3,2-f]quinolines also have antibacterial properties, although they are not as active as the above-described 7,10-dihydro-3,10-dioxo-7-(lower-alkyl)-9-X-3H-pyrano[3,2-f]quinolines.

The intermediate 10-hydroxy-3-oxo-9-X-3H-pyrano-[3,2-f]quinolines exist in tautomeric forms. Illustrating this tautomerism in the case of Formula II

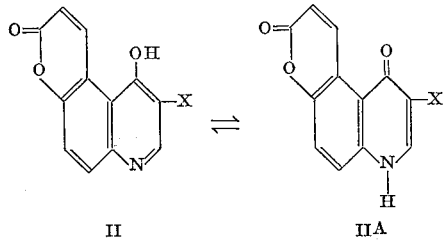

As with all tautomeric systems, the rate of transformation II⇌IIA, and the ratio II/IIA, are dependent on the thermodynamic environment, including the state of aggregation; so that measurements by any particular technique do not necessarily have validity except under the conditions of the measurement, thereby, among other consequences, giving rise to problems for any simple designation of the physical embodiments. Thus, measurements of the infrared spectra, in potassium bromide admixture, or in chloroform or mineral oil, indicate existence predominantly as IIA, but nevertheless I have preferred to use the names based on structure II, although it is understood that either or both structures are comprehended.

The molecular structures of the compounds of my invention are established by their modes of synthesis and confirmed by the correspondence of calculated and found values for the elementary analyses for representative examples and by infrared, ultraviolet and NMR spectral analyses.

My 7,10-dihydro-3,10-dioxo-7-(lower-alkyl)-9-X-3H-pyrano[3,2-f]quinolines have been tested by standard biological evaluation procedures and found to have antibacterial properties, e.g., when tested according to standard in vitro bacteriological evaluation procedures they have been found to possess antibacterial activity, for example, against *Staphylococcus aureus*, *Clostridium welchii* and *Eberthella typhi*, at test concentration levels in the range of 0.0025 mg./cc. to about 0.1 mg./cc., as illustrated below in the examples. Preferred embodiments were found to have in vivo activity against Gram-negative bacteria, e.g., *Klebsiella pneumoniae*, and against Gram-positive bacteria, e.g., *Staphylococcus aureus*, in Swiss mice when administered orally and/or subcutaneously at dose levels in the range of about 50 to 400 mg./kg./day; they were also found to have anthelmintic activity against enterobiasis (pinworm infection) in mice, as illustrated hereinbelow.

The following examples will further illustrate the invention without, however, limiting it thereto.

EXAMPLE 1

(A) 7,10 - dihydro - 3,10-dioxo-7-methyl-3H-pyrano-[3,2-f]quinoline-9-carboxylic acid. To a stirred mixture containing 15.0 g. of ethyl 10-hydroxy-3-oxo-3H-pyrano-[3,2-f]quinoline-9-carboxylate, 27.6 g. of anhydrous potassium carbonate and 200 ml. of dimethylformamide heated on a steam bath was added 14.2 g. of methyl iodide, whereupon carbon dioxide evolved and a solution resulted in one to two minutes. The solution was heated on a steam bath with stirring for two hours and then poured into one liter of cold water. The resulting precipitate, ethyl 7,10 - dihydro-3,10-dioxo-7-methyl-3H-pyrano[3,2-f]quinoline - 9 - carboxylate, was collected, stirred with 600 ml. of 10% aqueous potassium hydroxide solution for ten minutes at room temperature, heated to boiling, treated with decolorizing charcoal, filtered while hot, and allowed to cool to room temperature. The solution was acidified with dilute hydrochloric acid and the resulting precipitate was collected, recrystallized from a large volume of dimethylformamide, and dried in a vacuum oven at 60° C. to yield 10 g. (71%) of 7,10-dihydro - 3,10 - dioxo - 7 - methyl-3H-pyrano[3,2-f]-quinoline-9-carboxylic acid, M.P. 359–360° C. with decomposition.

*Analysis.*—Calcd. for $C_{14}H_9NO_5$: C, 61.99; H, 3.34; N, 5.17. Found: C, 62.19; H, 3.22; N, 5.25.

7,10 - dihydro - 3,10 - dioxo - 7 - methyl - 3H - pyrano[3,2-f]quinoline - 9 - carboxylic acid was found to have in vivo activity against *Klebsiella pneumoniae* in mice when administered subcutaneously at a dose level of 50 mg./kg./day (5 out of 10 mice survived) and 200 mg./kg./day (7 out of 10 mice survived). When tested in vitro, this compound was found to have bacteriostatic activity against *Staphylococcus aureus*, *Eberthella typhi* and *Clostridium welchii* at respective concentrations of 0.01, 0.025 and 0.005 mg./cc.; and, to have bactericidal activity against *Eberthella typhi* and *Clostridium welchii* at respective concentrations of 0.075 and 0.025 mg./cc. 7,10 - dihydro - 3,10 - dioxo-7-methyl-3H-pyrano[3,2-f]quinoline-9-carboxylic acid was also found to have in vivo activity against *Aspicularis tetraptera* in mice when administered orally at dose levels of 200 mg./kg./day (6 out of 10 mice cleared) and at 400 mg./kg./day (8 out of 10 mice cleared).

(B) The intermediate ethyl 10-hydroxy-3-oxo-3H-pyrano[3,2-f]quinoline-9-carboxylate used in Example 1A was prepared in two steps as follows: A mixture containing 60 g. of 6-aminocoumarin and 80 g. of diethyl ethoxymethylenemalonate was heated on a steam bath in vacuo (about 15 mm.) for one hour. The resulting material was recrystallized from ethyl acetate and dried in vacuo at 60° C. to yield 96 g. (78%) of diethyl N-(6-courmarinyl)aminomethylenemalonate, same as 6-[2,2-(diethoxycarbonyl)vinylamino]coumarin, M.P. 147.4–149.2° C. (corr.).

*Analysis.*—Calcd. for $C_{17}H_{17}NO_6$: C, 61.62; H, 5.17; N, 4.23. Found: C, 61.67; H, 5.38; N, 4.24.

To 1.0 liter of Dowtherm A (eutectic mixture of diphenyl and diphenyl ether) heated to 240° C. was added with stirring 86 g. of diethyl N-(6-coumarinyl)aminomethylenemalonate. The mixture was refluxed with stirring for ten minutes while distilling off the ethanol formed by the reaction and allowed to cool. The resulting precipitate was collected, washed with n-hexane and air-dried to yield 62 g. (93%) of ethyl 10-hydroxy-3 - oxo - 3H - pyrano[3,2-f]quinoline - 9 - carboxylate. Recrystallization of 15 g. of this intermediate from a large volume of dimethylformamide yielded 13 g. melting at 344–345° C. with decomposition.

*Analysis.*—Calcd. for $C_{15}H_{11}NO_5$: C, 63.16; H, 3.89; N, 4.91. Found: C, 63.38; H, 3.79; N, 4.74.

When tested according to standard in vitro bacteriological evaluation procedures, ethyl 10-hydroxy-3-oxo-3H-pyrano[3,2-f]quinoline - 9 - carboxylate was found to have bacteriostatic activity against *Pseudomonas aeruginosa* at a concentration of 0.10 mg./cc.

10-hydroxy - 3 - oxo - 3H - pyrano[3,2-f]quinoline-9-carboxylic acid is obtained by hydrolysis of the above ethyl ester with dilute aqueous potassium hydroxide solution. Use of this acid in Example 1A in place of its ester, and using aqueous ethanol as the solvent, aqueous potassium hydroxide solution as the acid-acceptor and methyl iodide as the alkylating agent, the same product of Example 1A is obtained, i.e., 7,10-dihydro-3,10-dioxo-7-methyl-3H-pyrano[3,2-f]quinoline-9-carboxylic acid.

Following the procedure of Example 1A and using n-propyl chloride, isobutyl para-toluenesulfonate or n-hexyl bromide in place of methyl iodide, there is obtained, respectively, ethyl 7,10-dihydro - 3,10 - dioxo-7-n-propyl-3H - pyrano[3,2-f]quinoline-9-carboxylate, ethyl 7,10-dihydro - 3,10 - dioxo-7-isobutyl-3H-pyrano[3,2-f]quinoline-9-carboxylate or ethyl 7,10-dihydro-3,10-dioxo-7-n-hexyl-3H-pyrano[3,2-f]-9-carboxylate; the corresponding respective 9-carboxylic acids are obtained by alkaline hydrolysis of the ester with aqueous potassium hydroxide solution as in Example 1A.

EXAMPLE 2

7,10 - dihydro - 3,10 - dioxo-7-ethyl-3H-pyrano[3,2-f]quinoline-9-carboxylic acid was prepared following the procedure described in Example 1A using 15 g. of ethyl 10 - hydroxy - 3 - oxo-3H-pyrano[3,2-f]quinoline-9-carboxylate, 27.6 g. of anhydrous potassium carbonate, 200 ml. of dimethylformamide, 15.6 g. of ethyl iodide, and a heating period of four hours. Ethyl 7,10-dihydro-3,10-dioxo - 7 - ethyl - 3H - pyrano[3,2-f]quinoline-9-carboxylate was first formed. After acidification of the potassium hydroxide solution with hydrochloric acid, the product was collected, washed with ether, and dried in a vacuum oven at 60° C. to yield 10 g. (67%) of 7,10-dihydro-3,10-dioxo-7-ethyl - 3H - pyrano[3,2-f]quinoline-9-carboxylic acid, M.P. 318–320° C. with decomposition.

*Analysis.*—Calcd. for $C_{15}H_{11}NO_5$: C, 63.16; H, 3.89; N, 4.91. Found: C, 62.96; H, 3.84; N, 5.03.

7,10 - dihydro - 3,10 - dioxo - 7 - ethyl - 3H - pyrano[3,2 - f]quinoline - 9 - carboxylic acid was found to have in vivo activity against *Staphylococcus aureus* in mice when administered orally at 400 mg./kg./day (9 out of 10 mice survived) and subcutaneously at 400 mg./kg./day (8 out of 10 mice survived); and, against *Klebsiella pneumoniae* in mice when administered subcutaneously at 200 mg./kg./day (15 out of 20 mice survived) and orally at 400 mg./kg./day (7 out of 10 mice survived). When tested in vitro, this compound was found to have bacteriostatic activity against *Staphylococcus aureus, Eberthella typhi* and *Clostridium welchii* at respective concentrations of 0.025, 0.0075 and 0.025 mg./cc.; and to have bactericidal activity against *Clostridium welchii* at 0.1 mg./cc.

Following the procedure described in Example 1A using corresponding molar equivalent quantities of the appropriate lower-alkyl (preferably ethyl) 10-hydroxy-3-oxo-3H - pyrano[3,2 - f]quinoline - 9 - carboxylate and lower-alkyl ester, preferably halide, the compounds of Table A are obtained.

Table A

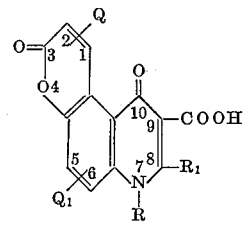

| No. | R | $R_1$ | Q | $Q_1$ |
|---|---|---|---|---|
| 1 | $n\text{-}C_4H_9$ | H | H | H- |
| 2 | $n\text{-}C_6H_{13}$ | H | $1\text{-}CH_3$ | $6\text{-}CH_3$ |
| 3 | $C_2H_5$ | $CH_3$ | H | H |
| 4 | $C_2H_5$ | H | H | $5\text{-}OCH_3$ |
| 5 | $C_2H_5$ | H | H | $5\text{-}Br$ |
| 6 | $i\text{-}C_4H_9$ | H | H | $5\text{-}I$ |
| 7 | $C_2H_5$ | H | $3\text{-}Br$ | $5\text{-}Br$ |
| 8 | $CH_3$ | H | $1\text{-}CH_3$ | H |
| 9 | $CH_3$ | H | H | $6\text{-}CH_3$ |
| 10 | $C_2H_5$ | H | $1,2\text{-}(CH_3)_2$ | $6\text{-}CH_3$ |
| 11 | $C_2H_5$ | H | $1\text{-}OCH_3$ | $5\text{-}C_2H_5$ |
| 12 | $C_2H_5$ | H | $1\text{-}n\text{-}C_4H_9$ | $6\text{-}OC_4H_9\text{-}n$ |
| 13 | $CH_3$ | H | H | $6\text{-}Cl$ |
| 14 | $CH_3$ | H | H | $5\text{-}n\text{-}C_6H_{13}$ |

The intermediate lower-alkyl 10-hydroxy-3-oxo-3H-pyrano[3,2-f]quinoline-9-carboxylate needed to prepare the compounds of Table A can be prepared in two steps following the procedures described in Example 1B for the preparation of ethyl 10 - hydroxy - 3 - oxo - 3H-pyrano[3,2 - f]quinoline - 9 - carboxylate and using corresponding molar equivalent quantities of the appropriate reactants, illustrated as follows for the compound of Example 10: diethyl N - (3,4,7 - trimethyl - 6 - coumarinyl)-aminomethylenemalonate is obtained by reacting 6-amino-3,4,7 - trimethylcoumarin with diethyl ethoxymethylenemalonate and ethyl 10 - hydroxy - 3 - oxo - 1,2,6 - trimethyl - 3H - pyrano[3,2 - f]quinoline - 9 - carboxylate is formed next in the cyclization step. The 10-hydroxy-3 - oxo - 1,2,6 - trimethyl - 3H - pyrano[3,2 - f]quinoline-9-carboxylic acid is prepared by hydrolysis of the ethyl ester. Conversion of the acid to its acid chloride by reaction with phosphorus oxychloride and reaction of the acid chloride with isobutyl alcohol or n-hexanol yields, respectively, isobutyl or n-hexyl 10-hydroxy-3-oxo-1,2,6-trimethyl - 3H - pyrano[3,2 - f]quinoline - 9 - carboxylate. The intermediate 6-aminocoumarin derivatives are generally known compounds which are prepared by known procedures.

I claim:

1. A 7,10 - dihydro - 3,10 - dioxo - 7 - (lower - alkyl)-9 - X - 3H - pyrano[3,2 - f]quinoline where X is a member selected from the group consisting of carboxy and lower-carbalkoxy.

2. A compound of the formula

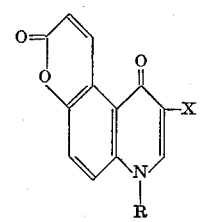

where X is lower-carbalkoxy and R is lower-alkyl.

3. A compound of the formula

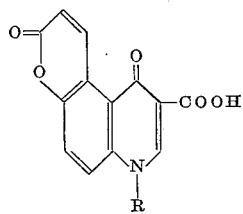

where R is a lower-alkyl.

4. 7,10 - dihydro - 3,10 - dioxo - 7 - methyl - 3H-pyrano[3,2-f]quinoline-9-carboxylic acid.

5. 7,10 - dihydro - 3,10 - dioxo - 7 - ethyl - 3H - pyrano[3,2-f]quinoline-9-carboxylic acid.

6. A 10 - hydroxy - 7 - (lower - alkyl) - 3 - oxo - 9-X-3H-pyrano[3,2-f]quinoline where X is a member selected from the group consisting of carboxy and lower-carbalkoxy.

7. A compound of the formula

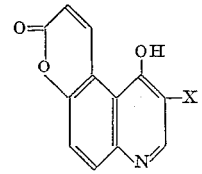

where X is a lower-carbalkoxy.

8. Ethyl 10 - hydroxy - 3 - oxo - 3H - pyrano[3,2 - f]-quinoline-9-carboxylate.

No references cited.

ALEX MAZEL, *Primary Examiner.*

DONALD G. DAUS, *Assistant Examiner.*

UNITED STATES PATENT OFFICE
CERTIFICATE OF CORRECTION

Patent No. 3,313,818                                April 11, 1967

George Y. Lesher

It is hereby certified that error appears in the above numbered patent requiring correction and that the said Letters Patent should read as corrected below.

Column 3, lines 16 to 34, the formulae should appear as shown below instead of as in the patent:

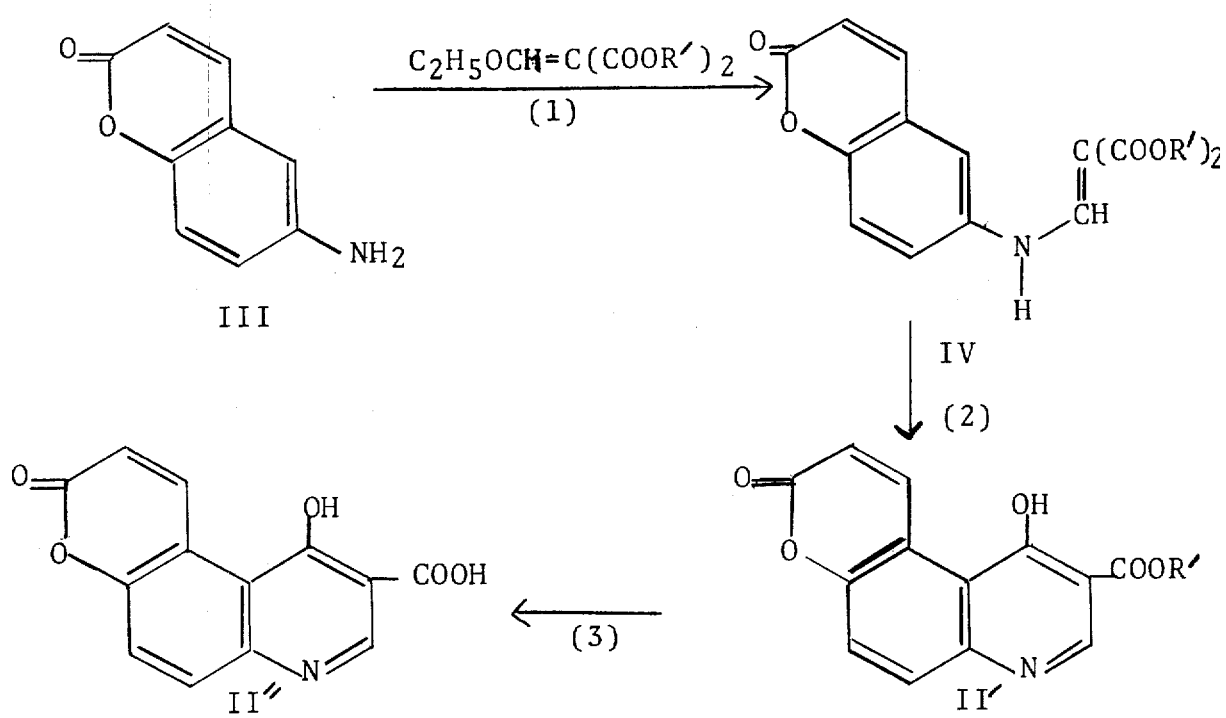

Signed and sealed this 28th day of November 1967.

(SEAL)
Attest:

EDWARD M. FLETCHER, JR.                        EDWARD J. BRENNER
Attesting Officer                                  Commissioner of Patents